(12) United States Patent
Ukon et al.

(10) Patent No.: US 9,163,696 B2
(45) Date of Patent: Oct. 20, 2015

(54) DAMPER DEVICE

(71) Applicant: Fuji Jukogyo Kabushiki Kaisha, Tokyo (JP)

(72) Inventors: Yasuyuki Ukon, Tokyo (JP); Mamoru Murakami, Tokyo (JP); Yuuki Suzuki, Tokyo (JP); Tsuyoshi Shinohara, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/197,083

(22) Filed: Mar. 4, 2014

(65) Prior Publication Data

US 2014/0274561 A1 Sep. 18, 2014

(30) Foreign Application Priority Data

Mar. 13, 2013 (JP) .................. 2013-050699
Mar. 13, 2013 (JP) .................. 2013-050705

(51) Int. Cl.
*F16H 15/14* (2006.01)
*F16H 35/12* (2006.01)
*F16H 45/02* (2006.01)
*F16F 15/14* (2006.01)

(52) U.S. Cl.
CPC ............. *F16F 15/1478* (2013.01); *F16H 35/12* (2013.01); *F16H 45/02* (2013.01); *Y10T 477/753* (2015.01)

(58) Field of Classification Search
CPC .............................. F16F 15/1478; F16H 35/12
USPC ........................................ 475/73, 35
See application file for complete search history.

(56) References Cited

U.S. PATENT DOCUMENTS

| 4,286,477 | A | * | 9/1981 | Meyerle et al. | 475/82 |
| 4,856,639 | A | * | 8/1989 | Fukushima | 192/55.61 |
| 2013/0068580 | A1 | * | 3/2013 | Doegel et al. | 192/3.28 |
| 2013/0244800 | A1 | | 9/2013 | Sakai et al. | |
| 2014/0274562 | A1 | * | 9/2014 | Ukon et al. | 477/175 |

FOREIGN PATENT DOCUMENTS

WO WO 2012/066680 A1 5/2012

* cited by examiner

*Primary Examiner* — Derek D Knight
*Assistant Examiner* — Timothy M Hannon
(74) *Attorney, Agent, or Firm* — McGinn IP Law Group, PLLC.

(57) ABSTRACT

A damper device is disposed between an engine and a transmission and has a torque distribution mechanism that is provided with a first input element connected to the engine, a second input element connected to the engine via an elastic member, a first output element connected to the transmission, and a second output element connected to the transmission. The damper device further has a first clutch that is disposed between the first output element and the transmission, and is switched between an engaged state of connecting the first output element to the transmission and a released state of disconnecting the first output element from the transmission, and a second clutch that is disposed between the second output element and the transmission, and is switched between an engaged state of connecting the second output element to the transmission and a released state of disconnecting the second output element from the transmission.

2 Claims, 15 Drawing Sheets

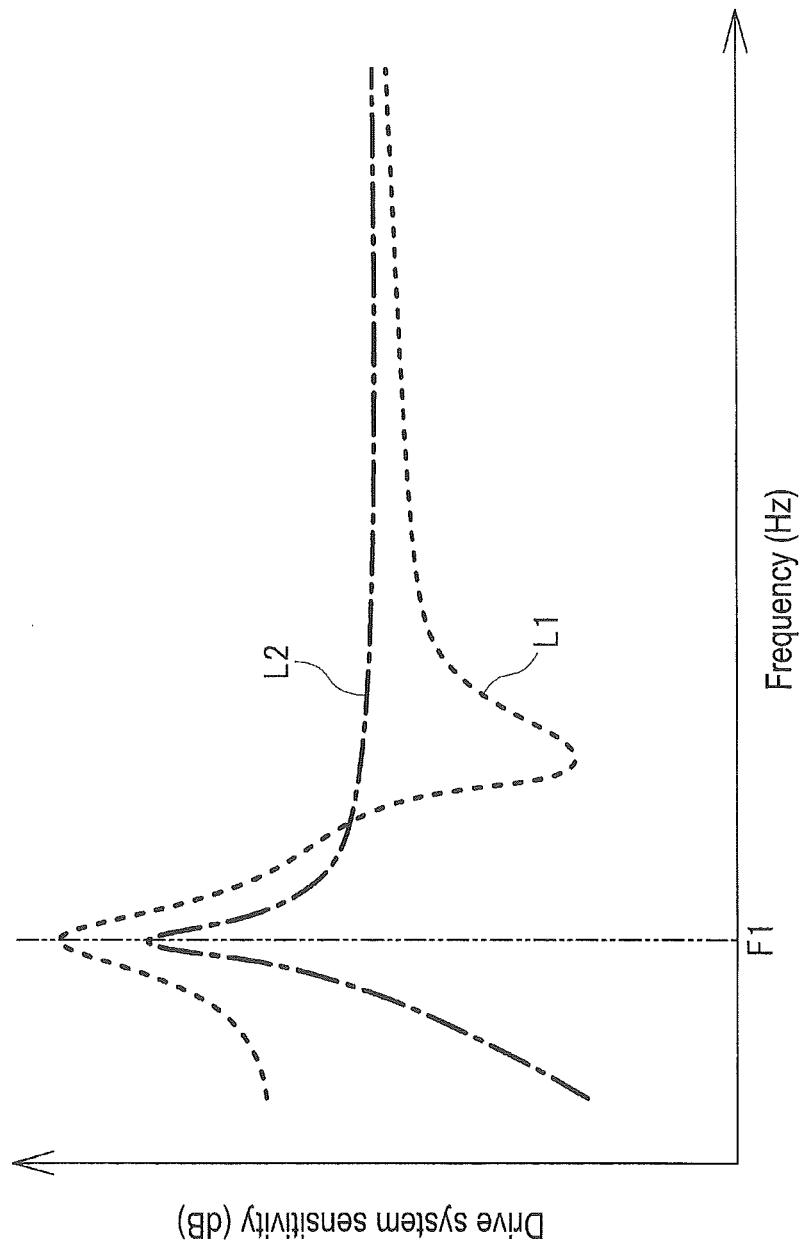

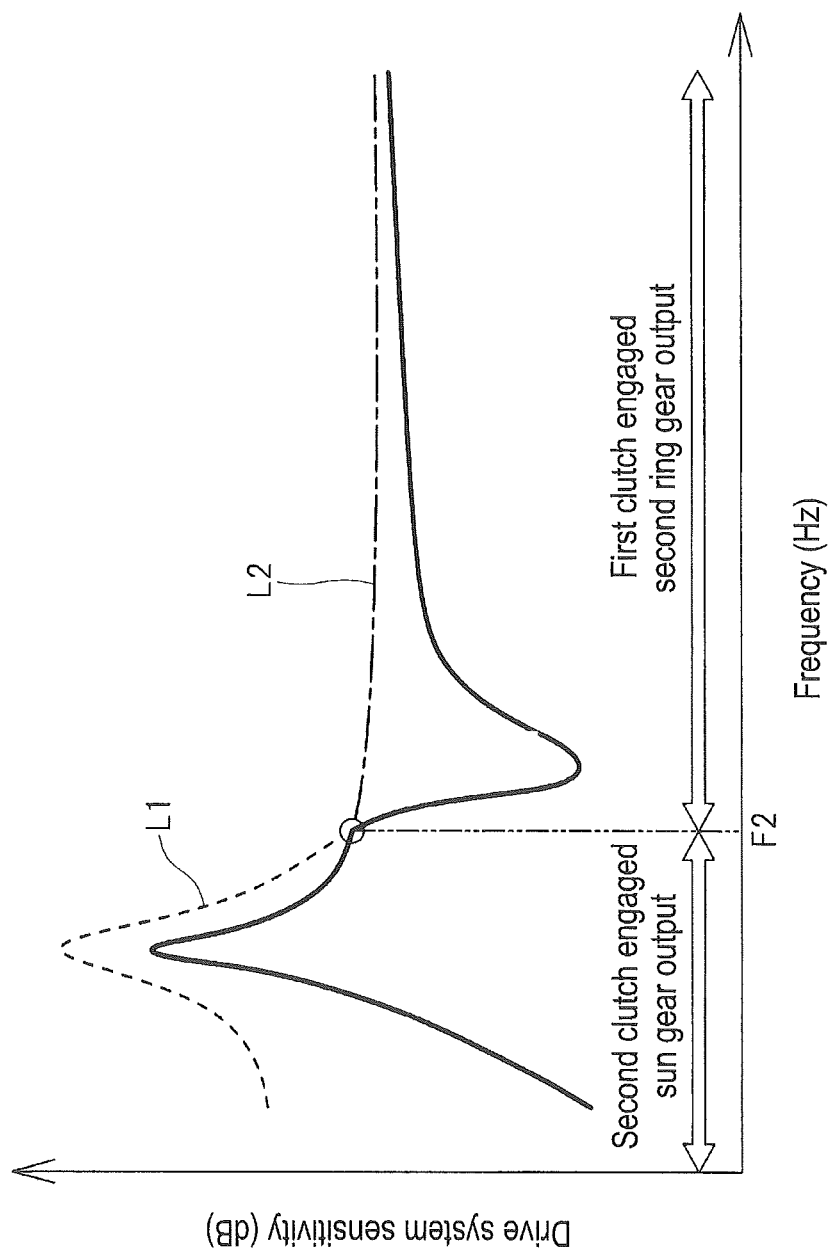

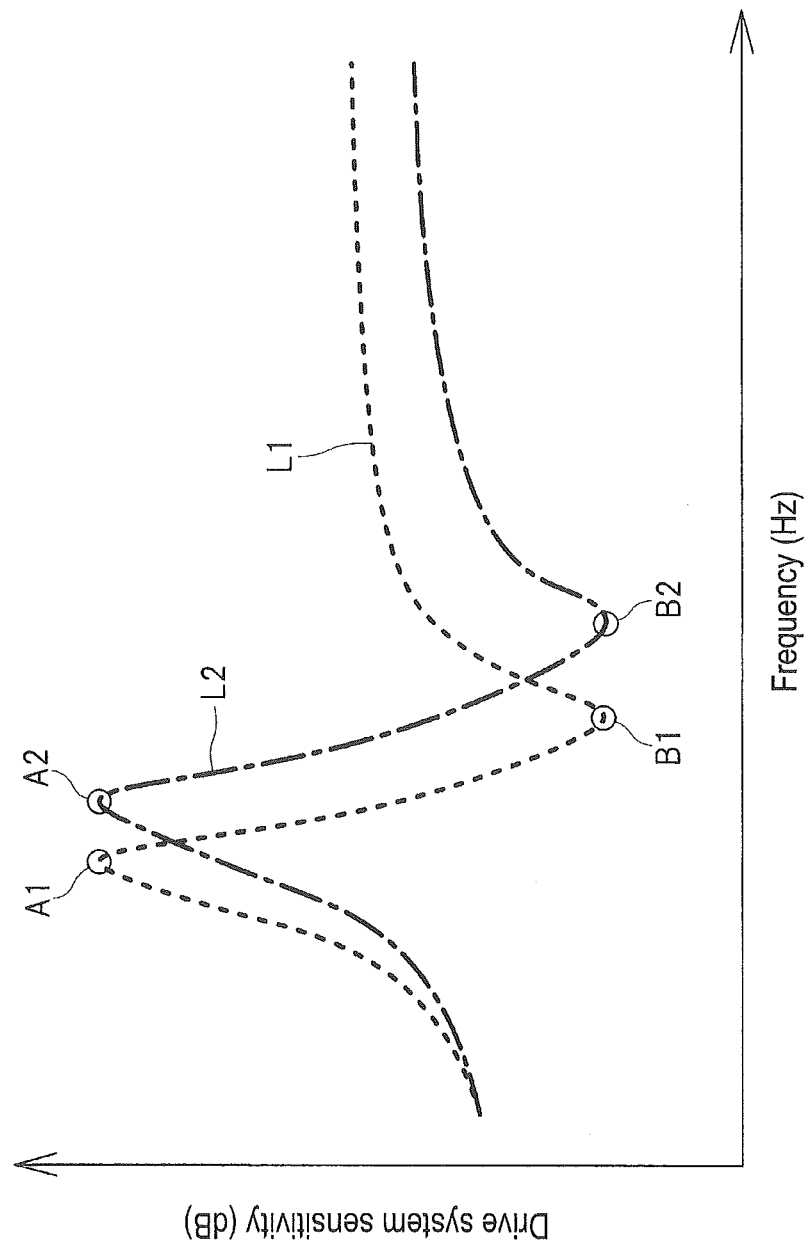

US 9,163,696 B2

DAMPER DEVICE

CROSS-REFERENCE TO RELATED APPLICATIONS

The present application claims priority from Japanese Patent Application Nos. 2013-050699 and 2013-050705, both filed on Mar. 3, 2013, the entire contents of which are hereby incorporated by reference.

BACKGROUND

1. Technical Field

The present invention relates to a damper device disposed between an engine and a transmission.

2. Related Art

A damper device is disposed between an engine and a transmission in order to reduce torsional vibration that is transmitted from the engine to the transmission. For example, a damper device has been proposed that includes two flywheels connected to each other via a spring (see PCT International Publication No. WO 2012/66680). The connection of the two flywheels via the spring can suppress the torsional vibration of the engine.

Damper devices are designed so as to exclude a resonance point (natural frequency) of the damper device from a normal region of engine revolutions, through adjustment of the mass and spring constant of the various members that make up the damper device. Through mere adjustment of masses and spring constants in the damper device, however, it is difficult to exclude the resonance point of the damper device from a wide region, extending from a low-revolutions region to a high-revolutions region. Accordingly, it is difficult to suppress torsional vibration of the engine over a wide region in cases where conventional damper devices are used.

SUMMARY OF THE INVENTION

The present invention has been designed in consideration of the circumstances described above, and an object thereof is to suppress engine torsional vibration over a wide region.

An aspect of the present invention provides a damper device that is disposed between an engine and a transmission, the damper device having: a torque distribution mechanism including a first input element connected to the engine, a second input element connected to the engine via an elastic member, a first output element connected to the transmission, and a second output element connected to the transmission; a first clutch that is disposed between the first output element and the transmission, and that is switched between an engaged state of connecting the first output element to the transmission and a released state of disconnecting the first output element from the transmission; and a second clutch that is disposed between the second output element and the transmission, and that is switched between an engaged state of connecting the second output element to the transmission and a released state of disconnecting the second output element from the transmission.

BRIEF DESCRIPTION OF THE DRAWINGS

FIG. 4 is an image diagram illustrating a damping characteristic of torsional vibration by the damper device;

FIG. 5 is an explanatory diagram illustrating a control state of a first clutch and a second clutch;

FIG. 9 is an image diagram illustrating a damping characteristic of torsional vibration by the damper device;

DETAILED DESCRIPTION

Figure 1:
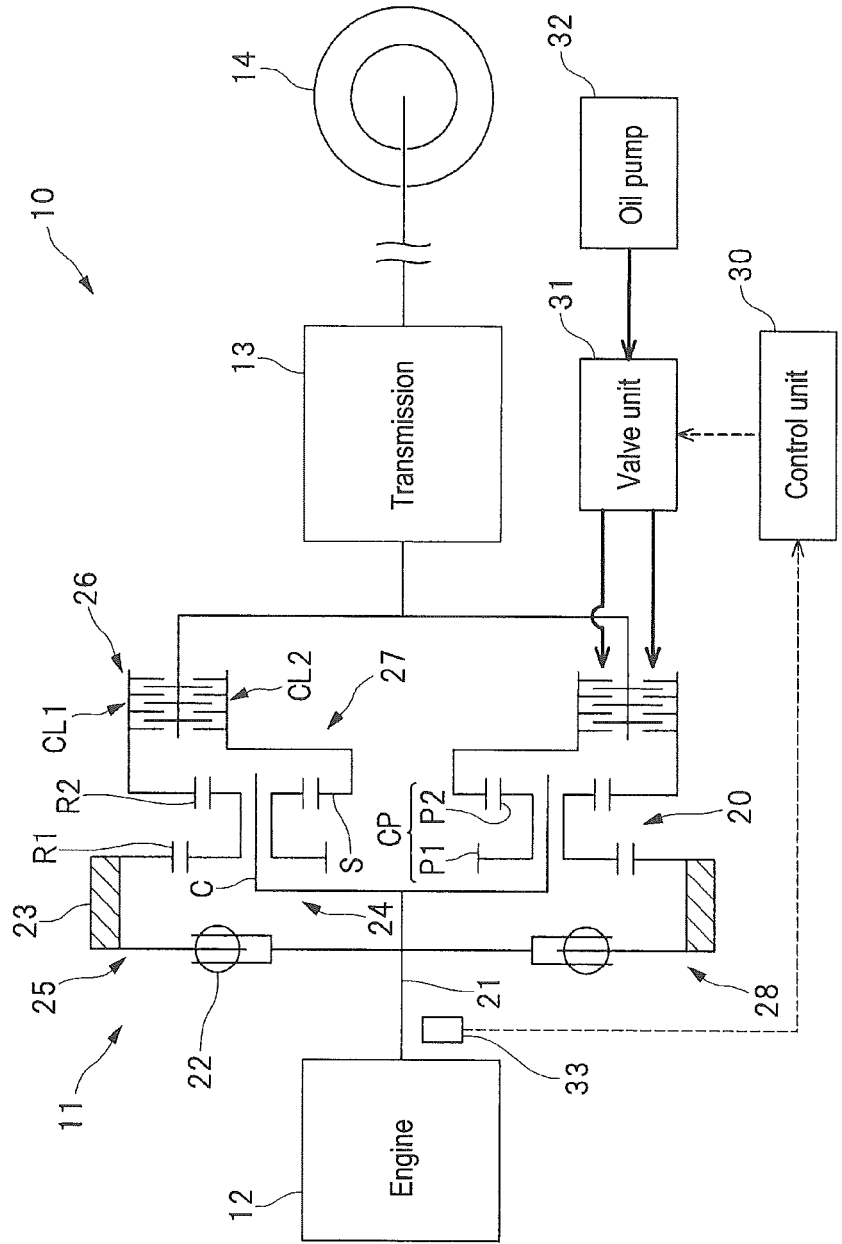
FIG. 1 is a schematic diagram illustrating a power unit that is provided with a damper device, which is a first implementation of the present invention.
Figure 2:
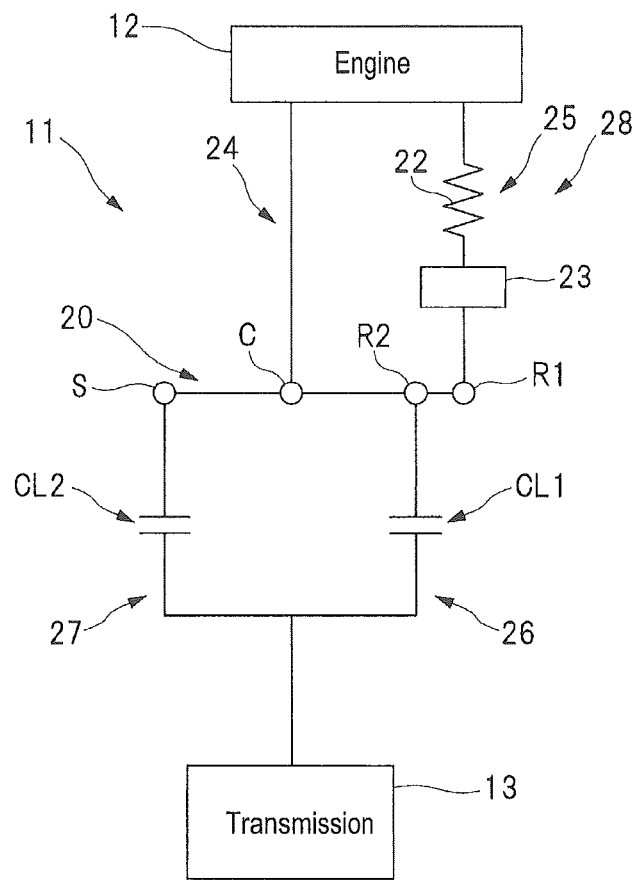
FIG. 2 is an explanatory diagram illustrating a structure model of the damper device built into the power unit.
Figure 3A:
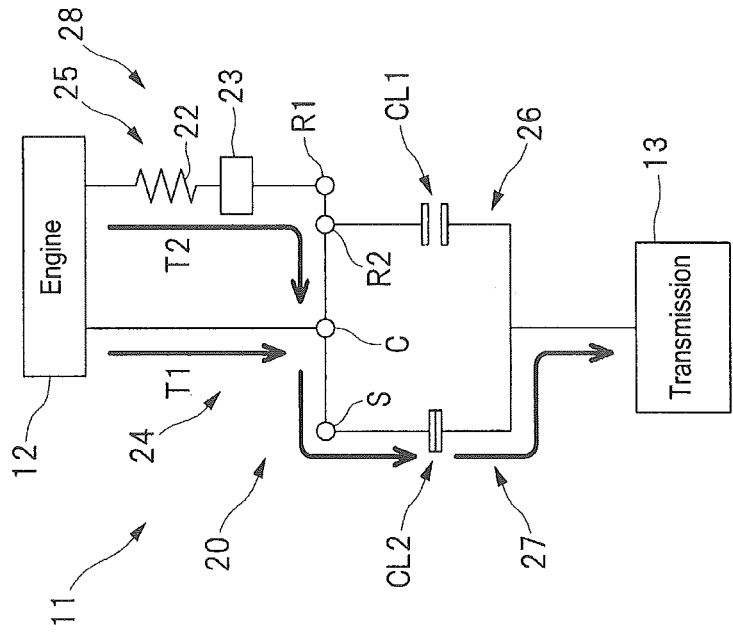
FIG. 3A and FIG. 3B are explanatory diagrams illustrating instances of transmission of engine torque.
Figure 3B:
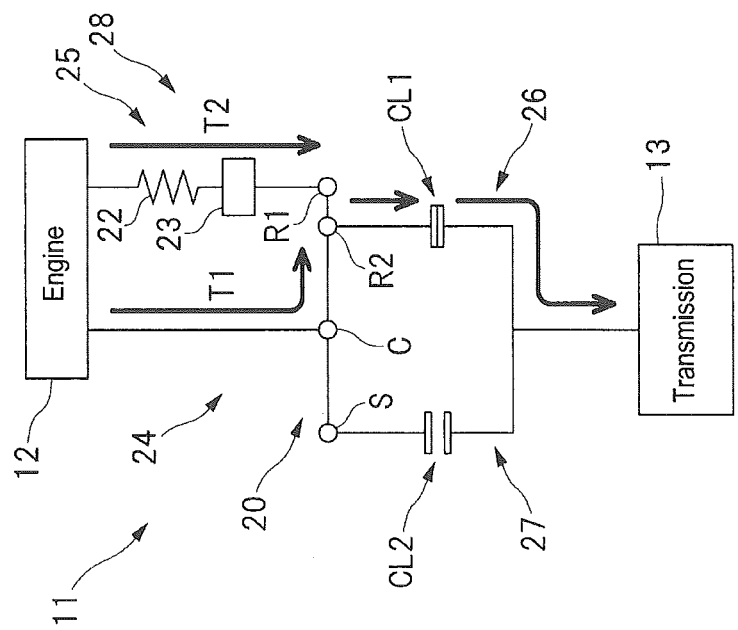

Implementations of the present invention are explained in detail next with reference to accompanying drawings. FIG. 1 is a schematic diagram illustrating a power unit 10 comprising a damper device, which is a first implementation of the present invention. FIG. 2 is an explanatory diagram illustrating a structure model of a damper device 11 that is built into the power unit 10. FIG. 3A and FIG. 3B are explanatory diagrams illustrating instances of transmission of engine torque. As illustrated in FIG. 1, the power unit 10 has an engine 12, being an internal combustion engine, and a transmission 13 that is connected to the engine 12 via a damper device 11. Thus, the damper device 11 is disposed between the engine 12 and the transmission 13, such that torsional vibration derived from vibration forces of the engine 12 is damped by the damper device 11. As used herein, the term torsional vibration of the engine 12 denotes torque variation derived from, for instance, unbalanced inertial forces and combustion vibration forces that act upon a crankshaft 21 of the engine 12. A drive wheel 14 is connected to the transmission 13 via a differential device not illustrated, and so forth.

As illustrated in FIG. 1 and FIG. 2, the damper device 11 comprises a torque distribution mechanism (planetary gear mechanism) 20 made up of a compound planetary gear train. The torque distribution mechanism 20 comprises a carrier (first input element) C connected with the crankshaft 21, and a first ring gear (second input element) R1 connected to the crankshaft 21 via a spring (elastic member) 22. An inertia member 23 having a predetermined mass is fixed to the first ring gear R1 that is connected to the crankshaft 21 via the spring 22. The torque distribution mechanism 20 comprises a second ring gear (first output element) R2 connected to the transmission 13, and a sun gear (second output element) S that is connected to the transmission 13. Further, a compound pinion gear CP, having a first pinion gear P1 and a second pinion gear P2 integrally formed with each other, is rotatably provided in the carrier C. The first pinion gear P1 meshes with the first ring gear R1, and the second pinion gear P2 meshes with the second ring gear R2 and the sun gear S.

The torque distribution mechanism 20 is provided with two input paths 24 and 25, through which the engine torque is inputted, and two output paths 26 and 27 through which the engine torque is outputted. Specifically, the torque distribution mechanism 20 is provided with a first input path 24 through which the engine torque is inputted to the carrier C, and with a second input path 25 through which the engine torque is inputted to the first ring gear R1 via the spring 22. The torque distribution mechanism 20 is provided with a first output path 26 through which the engine torque is outputted from the second ring gear R2, and with a second output path 27 through which the engine torque is outputted from the sun gear S.

A first clutch CL1 that is switched between an engaged state and a released state is provided between the second ring gear R2 and the transmission 13. Thus, the second ring gear R2 becomes connected to the transmission 13 through switching of the first clutch CL1 to the engaged state, and the second ring gear R2 becomes disconnected from the transmission 13 through switching of the first clutch CL1 to the released state. In the case where the first clutch CL1 is switched to the engaged state, as illustrated in FIG. 3A, engine torques T1 and T2 that are distributed over the first input path 24 and the second input path 25 are combined via the torque distribution mechanism 20, and thereafter, the engine torques T1 and T2 are outputted through the second ring gear R2 and the first output path 26 to the transmission 13. Herein, the distribution ratio between the engine torque T1 and the engine torque T2 for canceling out the torque variation of the engine torque T1 is set on the basis of the number of teeth of the first ring gear R1, the first pinion gear P1, the second pinion gear P2 and the second ring gear R2.

Similarly, a second clutch CL2 that is switched between an engaged state and a released state is provided between the sun gear S and the transmission 13. The sun gear S becomes connected to the transmission 13 through switching of the second clutch CL2 to the engaged state, and the sun gear S becomes disconnected from the transmission 13 through switching of the second clutch CL2 to the released state. In a case where the second clutch CL2 is switched to the engaged state, as illustrated in FIG. 3B, the engine torques T1 and T2 that are distributed over the first input path 24 and the second input path 25 are combined via the torque distribution mechanism 20, and thereafter, are outputted through the sun gear S and the second output path 27 to the transmission 13. Herein, the distribution ratio between the engine torque T1 and the engine torque T2 for canceling out the torque variation of the engine torque T1 is set on the basis of the number of teeth of the first ring gear R1, the first pinion gear P1, the second pinion gear P2 and the sun gear S.

As illustrated in FIG. 1, a control unit 30 that functions as a clutch controller is provided in the power unit 10, with a view to controlling the first clutch CL1 and the second clutch CL2 of the damper device 11. The power unit 10 is provided with a valve unit 31 that comprises a plurality of electromagnetic valves, and with an oil pump 32 that pumps hydraulic oil towards the valve unit 31. An engine revolutions sensor 33 that detects a rotational speed (hereafter notated as engine revolutions) of the crankshaft 21 is connected to the control unit 30. The control unit 30 selects, on the basis of engine revolutions detected by the engine revolutions sensor 33, the clutch CL1 or CL2, whichever is to be switched to the engaged state, and outputs a control signal to the valve unit 31. Specifically, the control unit 30 switches the first clutch CL1 or the second clutch CL2 to the engaged state, on the basis of engine revolutions, and selects thereby the output path 26 or 27 for extracting the engine torque. The control unit 30 is made up of, for instance, a CPU that computes control signals and the like, a ROM that stores a control program, arithmetic expressions, map data and the like, and a RAM that stores data temporarily.

FIG. 4 is an image diagram illustrating a damping characteristic of torsional vibration by the damper device 11. In FIG. 4, the abscissa axis represents the vibration frequency, i.e. the frequency, of torsional vibration, and the ordinate axis represents drive system sensitivity, being the vibration acceleration level of torsional vibration. In FIG. 4, a characteristic line L1 represented by a dotted line denotes a damping characteristic of torsional vibration outputted from the second ring gear R2, and a characteristic line L2 represented by a dot-chain line denotes a damping characteristic of torsional vibration outputted from the sun gear S.

As indicated by the characteristic line L1 of FIG. 4, torsional vibration is amplified at a low frequency region, but torsional vibration is damped at a medium-high frequency region, in a case where the first clutch CL1 is engaged and the engine torque is outputted from the second ring gear R2. Specifically, the rotation phase of the crankshaft 21 and the rotation phase of the first ring gear R1 have the same direction at the low frequency region that is below a resonance point (natural frequency) F1 of a vibration system 28 that comprises the spring 22, the first ring gear R1 and the inertia member 23. That is, the rotation phase of the crankshaft 21 and the rotation phase of the second ring gear R2 have the same direction; as a result, the crankshaft 21 and the second ring gear R2 vibrate at the same phase, and torsional vibration is amplified, in a case where the engine torque is outputted from the second ring gear R2 at the low frequency region. By contrast, the rotation phase of the crankshaft 21 and the rotation phase of the first ring gear R1 have opposite directions at the medium-high frequency region beyond the resonance point F1 of the vibration system 28. The rotation phase of the crankshaft 21 and the rotation phase of the second ring gear R2 have opposite directions; as a result, the crankshaft 21 and the second ring gear R2 vibrate at opposite phases, and torsional vibration is damped, in a case where the engine torque is outputted from the second ring gear R2 at the medium-high frequency region.

As indicated by the characteristic line L2 in FIG. 4, the amplification amount of torsional vibration is curtailed to a greater degree than for the characteristic line L1, at the low frequency region, and the damping amount is curtailed to a greater degree than for the characteristic line L1, at the medium-high frequency region, in a case where the second clutch CL2 is engaged and the engine torque is outputted from the sun gear S. As described above, the rotation phase of the crankshaft 21 and the rotation phase of the first ring gear R1 have the same direction at the low frequency region that is below the resonance point (natural frequency) F1 of the vibration system 28. That is, the rotation phase of the crankshaft 21 and the rotation phase of the sun gear S have opposite directions; as a result, the amplification amount of torsional vibration is curtailed to a greater degree as compared with that of the characteristic line L1, in a case where the engine torque is outputted from the sun gear S, at the low frequency region. By contrast, the rotation phase of the crankshaft 21 and the rotation phase of the first ring gear R1 have opposite directions at the medium-high frequency region beyond the resonance point F1 of the vibration system 28. That is, the rotation phase of the crankshaft 21 and the rotation phase of the sun gear S have the same direction; as a result, the damping amount of torsional vibration is curtailed to a greater degree as compared with that of the characteristic line L1, in a case where the engine torque is outputted from the sun gear S, at the medium-high frequency region.

As illustrated in FIG. 4, a difference in damping characteristic of torsional vibration arises thus between an instance where the engine torque is outputted from the second ring gear R2, and in an instance where the engine torque is outputted from the sun gear S. Specifically, the distribution ratios of the engine torques T1 and T2 that are distributed over the first input path 24 and the second input path 25 are different between an instance where the engine torque is outputted from the second ring gear R2 and an instance where the engine torque is outputted from the sun gear S. A difference arises as a result in the damping characteristic of torsional vibration. In the configuration illustrated in the figure, in particular, the rotation directions of the second ring gear R2 and the sun gear S are different in a case where the compound pinion gear CP rotates while the spring 22 is stretched and compressed. As a result, a significant difference arises in the damping characteristic of torsional vibration.

The damping characteristic can be thus modified through switching between the output paths 26 and 27. Accordingly, the control unit 30 switches the first clutch CL1 or the second clutch CL2 to the engaged state on the basis of the frequency of torsional vibration, i.e. on the basis of engine revolutions. FIG. 5 is an explanatory diagram illustrating a control state of the first clutch CL1 and the second clutch CL2. As illustrated in FIG. 5, the second clutch CL2 is engaged, and the engine torque is outputted from the sun gear S, at a frequency region below a frequency F2 at which the characteristic lines L1 and L2 intersect, i.e. at a region at which engine revolutions are below reference revolutions corresponding to the frequency F2 of torsional vibration. On the other hand, the first clutch CL1 is engaged, and the engine torque is outputted from the second ring gear R2, at a frequency region beyond the frequency F2, i.e. at a region at which engine revolutions exceed the reference revolutions corresponding to the frequency F2 of torsional vibration.

A good damping characteristic can be obtained over the entire frequency region, as illustrated by the bold line in FIG. 5, through switching of the clutches CL1 and CL2 to the engaged state, on the basis of engine revolutions. The torsional vibration of the engine 12 can be suppressed thereby, and as a result, vehicle quality can be enhanced through suppression of vibration and noise. The load that acts on the transmission 13 can be reduced, and durability of the transmission 13 can be enhanced, through curtailment of the torsional vibration of the engine 12. By virtue of the curtailed vibration of the engine 12, the number of cylinders of the engine 12 can be reduced, the use region of engine revolutions can be lowered, and the fuel efficiency of the vehicle can be enhanced.

In the instance illustrated in the figure, the carrier C is set to function as a first input element, and the first ring gear R1 is set to function as a second input element, but the implementation is not limited thereto. For instance, the first ring gear R1 may be connected directly with the crankshaft 21, and the carrier C may be connected to the crankshaft 21 via the spring 22. In this case, the first ring gear R1 functions as the first input element, and the carrier C functions as the second input element. By providing the sun gear that meshes with the first pinion gear P1, the sun gear may be set to function as the first input element (or second input element). Thus, the first ring gear R1 may be set to function as the second input element (or first input element), and the carrier C may be set to function as the second input element (or first input element), in a case where the sun gear that meshes with the first pinion gear P1 is set to function as the first input element (or second input element). In the instance illustrated in the figure, the second ring gear R2 is set to function as the first output element, and the sun gear S is set to function as the second output element, but the implementation is not limited thereto. The carrier C may be set to function as the first output element (or second output element) upon disconnection from the crankshaft 21, in a case where, for instance, the sun gear that meshes with the first pinion gear P1 is set to function as the first input element (or second input element) and the first ring gear R1 is set to function as the second input element (or first input element), as described above.

In the description above, the second ring gear R2 is set to function as the first output element, and the sun gear S is set to function as the second output element, as a result of which the first output element and the second output element are caused to rotate in opposite directions upon rotation of the compound pinion gear CP, but the implementation of the present invention is not limited thereto.

For instance, a planetary gear train made up of the second ring gear R2, the second pinion gear P2 and the sun gear S may be configured in the form of a double pinion-type planetary gear train, so that, as a result, the first output element and the second output element are caused to rotate in the same direction upon rotation of the compound pinion gear CP. In this case as well, adjusting the number of teeth of the respective gears that make up the torque distribution mechanism 20 allows modifying the distribution ratio of the above-described engine torques T1 and T2, between an instance where the engine torque is outputted from the first output element and an instance where the engine torque is outputted from the second output element, and allows imparting a difference in the damping characteristic of torsional vibration.

Figure 6:
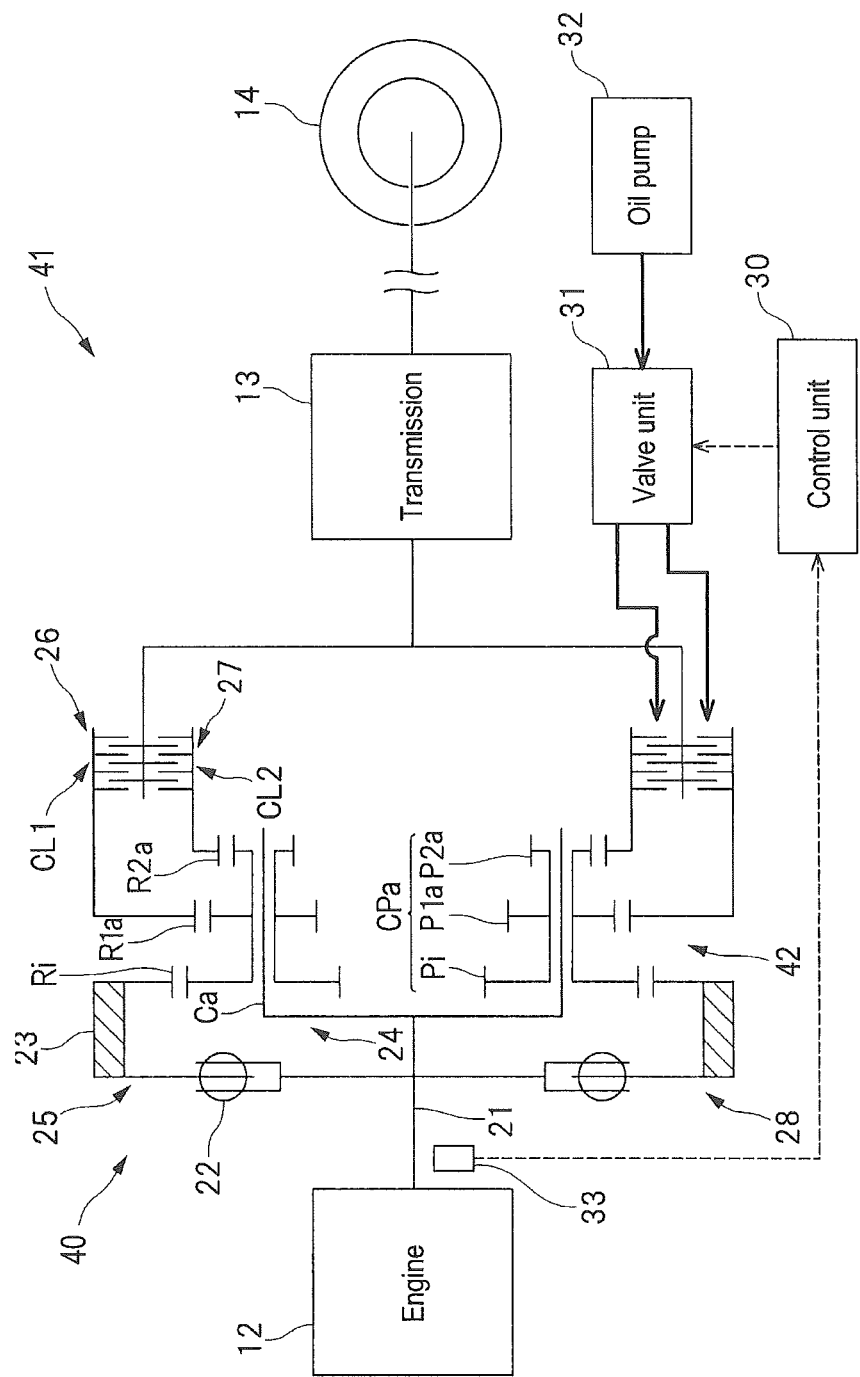
FIG. 6 is a schematic diagram illustrating a power unit that is provided with a damper device, which is a second implementation of the present invention.

FIG. 6 is a schematic diagram illustrating a power unit 41 comprising a damper device 40 being a second implementation of the present invention. In FIG. 6, members that are illustrated in FIG. 1 and members identical to those illustrated in FIG. 1 are denoted by identical reference symbols, and a recurrent description thereof will be omitted.

Figure 7:
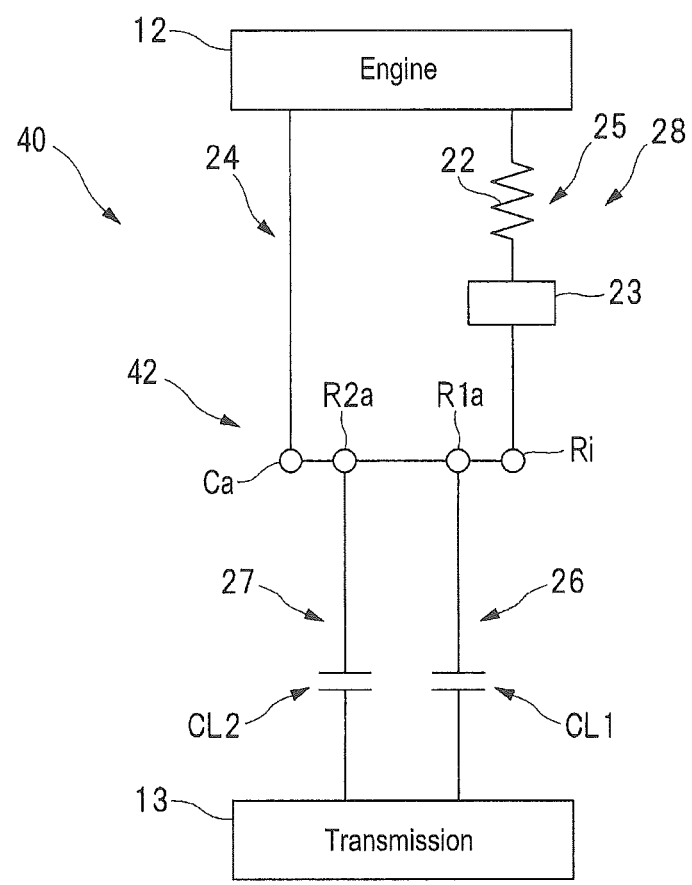
FIG. 7 is an explanatory diagram illustrating a structure model of the damper device built into a power unit.

As illustrated in FIG. 6 and FIG. 7, the damper device 40 comprises a torque distribution mechanism (planetary gear mechanism) 42 made up of a compound planetary gear train. The torque distribution mechanism 42 comprises the carrier (first input element) C connected with the crankshaft 21, and an input ring gear (second input element) Ri connected to the crankshaft 21 via a spring (elastic member) 22. The inertia member 23 having a predetermined mass is fixed to the input ring gear Ri that is connected to the crankshaft 21 via the spring 22. The torque distribution mechanism 42 further comprises a first ring gear (first output element, gear) R1a connected to the transmission 13, and a second ring gear (second output element, gear) R2a connected to the transmission 13. A compound pinion gear CPa is rotatably provided on the carrier C. The compound pinion gear CPa is made up of an input pinion gear Pi, a first pinion gear P1a and a second pinion gear P2a. The input pinion gear Pi meshes with the input ring gear Ri, the first pinion gear P1a meshes with the first ring gear R1a, and the second pinion gear P2a meshes with the second ring gear R2a. The number of teeth of the first ring gear R1a is greater than the number of teeth of the second ring gear R2a. That is, the number of teeth of the first ring gear R1a is different from the number of teeth of the second ring gear R2a.

As described above, the torque distribution mechanism 42 is provided with the two input paths 24 and 25, through which the engine torque is inputted and the two output paths 26 and 27 through which the engine torque is outputted. Specifically, the torque distribution mechanism 42 is provided with a first input path 24 through which the engine torque is inputted to the carrier C, and with a second input path 25 through which the engine torque is inputted to input ring gear Ri via the spring 22. By virtue of the spring 22 being provided thus in the second input path 25, the spring 22 can as a result be stretched and compressed in response to the torsional vibration of the engine 12, and the carrier C and the input ring gear Ri can be caused to rotate relatively to each other. The torque distribution mechanism 42 is also provided with the first output path 26 through which the engine torque is outputted from the first ring gear R1a, and with the second output path 27 through which the engine torque is outputted from the second ring gear R2a. The input paths 24, 25 and the output paths 26 and 27 are made up of rotating shafts, hub members, drum members and so forth.

Figure 8A:
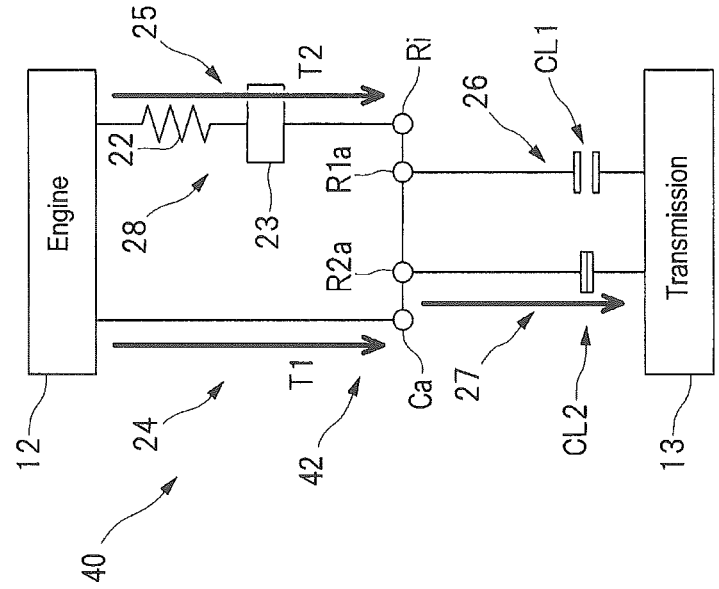
FIG. 8A and FIG. 8B are explanatory diagrams illustrating instances of transmission of engine torque.

The first clutch CL1 that is switched between the engaged state and the released state is provided between the first ring gear R1a and the transmission 13. The first ring gear R1a becomes connected to the transmission 13 through switching of the first clutch CL1 to the engaged state, and the first ring gear R1a becomes disconnected from the transmission 13 through switching of the first clutch CL1 to the released state. In a case where the first clutch CL1 is switched to the engaged state, as illustrated in FIG. 8A, the engine torques T1 and T2 that are distributed over the first input path 24 and the second input path 25 are combined via the torque distribution mechanism 42, and thereafter, the engine torques T1, T2 are outputted through the first ring gear R1a and through first output path 26 to the transmission 13. Herein, the distribution ratio between the engine torque T1 and the engine torque T2 for canceling out the torque variation of the engine torque T1 is set on the basis of the number of teeth of the input ring gear Ri, the input pinion gear Pi, the first ring gear R1a and the first pinion gear P1a.

Figure 8B:
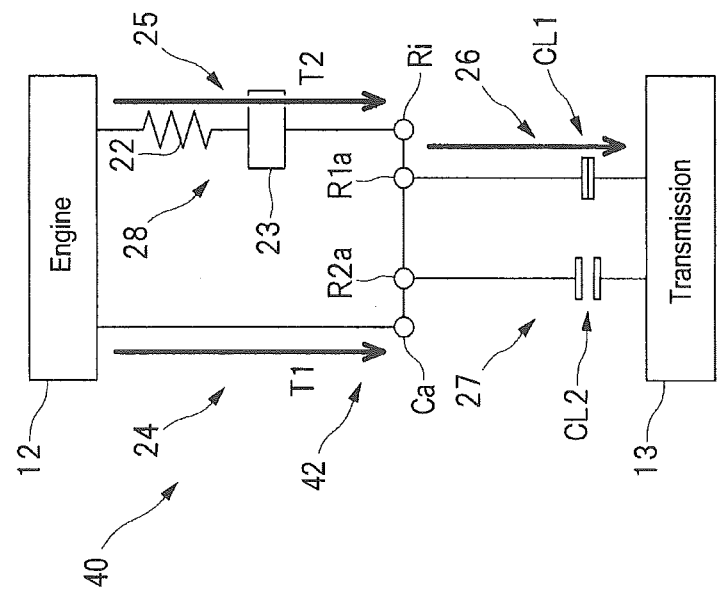

Similarly, the second clutch CL2 that is switched between the engaged state and the released state is provided between the second ring gear R2a and the transmission 13. The second ring gear R2a becomes connected to the transmission 13, through switching of the second clutch CL2 to the engaged state, and the second ring gear R2a becomes disconnected from the transmission 13 through switching of the second clutch CL2 to the released state. In a case where the second clutch CL2 is switched to the engaged state, as illustrated in FIG. 8B, the engine torques T1, T2 that are distributed over the first input path 24 and the second input path 25 are combined via the torque distribution mechanism 42, and thereafter, the engine torques T1, T2 are outputted from the second ring gear R2a and the second output path 27 to the transmission 13. Herein, the distribution ratio between the engine torque T1 and the engine torque T2 for canceling out the torque variation of the engine torque T1 is set on the basis of the number of teeth of the input ring gear Ri, the input pinion gear Pi, the second ring gear R2a and the second pinion gear P2.

As illustrated in FIG. 6, the control unit 30 that functions as a clutch controller is provided in the power unit 41, with a view to controlling the first clutch CL1 and the second clutch CL2 of the damper device 40. The power unit 41 is provided with the valve unit 31 that comprises a plurality of electromagnetic valves, and with the oil pump 32 that pumps hydraulic oil towards the valve unit 31. The engine revolutions sensor 33 that detects a rotational speed (hereafter notated as engine revolutions) of the crankshaft 21 is connected to the control unit 30. On the basis of engine revolutions detected by the engine revolutions sensor 33, the control unit 30 selects the clutches CL1, CL2 that are switched to the engaged state, and outputs a control signal to the valve unit 31. On the basis of engine revolutions, specifically, the control unit 30 switches the first clutch CL1 or the second clutch CL2 to the engaged state, and selects thereby the control unit 30 selects the output paths 26 and 27 for extracting the engine torque. The control unit 30 is made up of, for instance, a CPU that computes control signals and the like, a ROM that stores a control program, arithmetic expressions, map data and the like, and a RAM that stores data temporarily.

FIG. 9 is an image diagram illustrating a damping characteristic of torsional vibration by the damper device 40. In FIG. 9, the abscissa axis represents the vibration frequency, i.e. the frequency, of torsional vibration, and the ordinate axis represents drive system sensitivity, being the vibration acceleration level of torsional vibration. In FIG. 9, a characteristic line L1 represented by a dotted line denotes a damping characteristic of torsional vibration outputted from the first ring gear R1a, and a characteristic line L2 represented by a dot-chain line denotes a damping characteristic of torsional vibration outputted from the second ring gear R2a.

As indicated by the characteristic line L1 of FIG. 9, torsional vibration is amplified from a low frequency region over to a high frequency region, as denoted by the reference symbol A1, and torsional vibration is damped thereafter as denoted by the reference symbol B1, in a case where the engine torque is outputted from the first ring gear R1a. That is, the rotation phases of the crankshaft 21 and of the input ring gear Ri have the same direction, at a frequency region that is below a resonance point (natural frequency) of the vibration system 28 that comprises the spring 22, the input ring gear Ri and the inertia member 23. As a result, the crankshaft 21 and the input ring gear Ri vibrate at the same phase, and torsional vibration is amplified. The rotation phases of the crankshaft 21 and of the input ring gear Ri have opposite directions at a frequency region beyond the resonance point of the vibration system 28. As a result, the crankshaft 21 and the input ring gear Ri vibrate in opposite phases, and torsional vibration is damped. As indicated by the characteristic line L2 of FIG. 9, similarly, torsional vibration is amplified, as denoted by the reference symbol A2, from a low frequency region over to a high frequency region, and torsional vibration is damped thereafter as denoted by the reference symbol B2, in a case where the engine torque is outputted from the second ring gear R2a.

As denoted by the characteristic lines L1, L2 in FIG. 9, a difference in damping characteristic of torsional vibration arises between an instance where the engine torque is outputted from the first ring gear R1a and an instance where the engine torque is outputted from the second ring gear R2A. Specifically, the torsional vibration that is transmitted from the damper device 40 to the transmission 13 is a combination of the torsional vibration of the engine torque T1 that is inputted to the carrier C through the first input path 24, and the torsional vibration of the engine torque T2 that is inputted to the input ring gear Ri through the second input path 25. The amplitude and phase of vibration are mutually dissimilar between the torsional vibration of the engine torque T1 and the torsional vibration of the engine torque T2 for canceling out the torsional vibration of the engine torque T1. Accordingly, the torsional vibration outputted from the damper device 40, i.e. the torsional vibration at the time where the engine torques T1 and T2 are combined, can be caused to vary through modification of the distribution ratio of the engine torques T1 and T2.

As described above, the distribution ratio of the engine torques T1 and T2 at a time where the first clutch CL1 is engaged is determined on the basis of the number of teeth of the input ring gear Ri, the input pinion gear Pi, the first ring gear R1a and the first pinion gear P1a. The distribution ratio of the engine torques T1 and T2 at a time where the second clutch CL2 is engaged is determined on the basis of the number of teeth of the input ring gear Ri, the input pinion gear Pi, the second ring gear R2a and the second pinion gear P2. Herein, the number of teeth of the first ring gear R1a is different from that of the second ring gear R2A. It becomes possible as a result to modify the distribution ratio of the engine torques T1, T2 between an instance where the first clutch CL1 is engaged and an instance where the second clutch CL2 is engaged. That is, the damping characteristic of torsional vibration can be modified as a result of switching between the output paths 26, 27 through control of the clutches CL1 and CL2.

Figure 10:
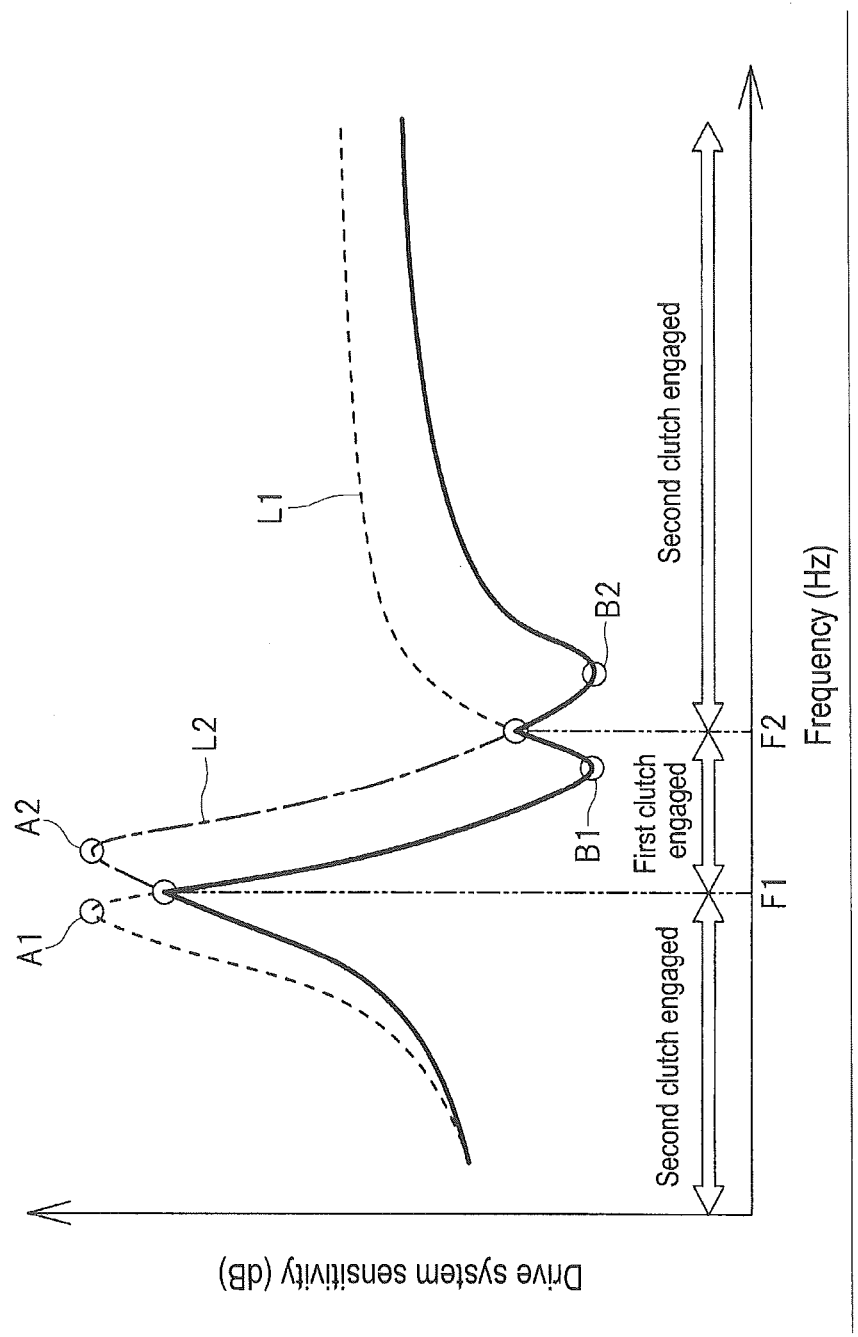
FIG. 10 is an explanatory diagram illustrating a control state of a first clutch and a second clutch.

The damping characteristic can be thus modified through switching between the output paths 26 and 27. As a result, the control unit 30 switches the first clutch CL1 or the second clutch CL2 to the engaged state on the basis of the frequency of torsional vibration, i.e. on the basis of engine revolutions. FIG. 10 is an explanatory diagram illustrating a control state of the first clutch CL1 and the second clutch CL2. As illustrated in FIG. 10, characteristic lines L1 and L2 intersect each other at frequencies F1 and F2. The second clutch CL2 is engaged, and the engine torque is outputted from the second ring gear R2a, at a frequency region below frequency F1, i.e. at a region at which engine revolutions are below revolutions corresponding to the frequency F1. The first clutch CL1 is engaged, and the engine torque is outputted from the first ring gear R1a, at a frequency region ranging from frequency F1 to frequency F2, i.e. at a region at which engine revolutions lie within a revolutions range corresponding to frequencies F1 to F2. The second clutch CL2 becomes engaged again, and the engine torque is outputted from the second ring gear R2a, at a frequency region beyond frequency F2, i.e. at a region at which engine revolutions exceed the revolutions corresponding to the frequency F2 of torsional vibration.

A good damping characteristic can be obtained over the entire frequency region, as illustrated by the bold line in FIG. 10, through switching of the clutches CL1 and CL2 to the engaged state, on the basis of engine revolutions. That is, a good damping characteristic can be obtained over the entire frequency region, in such a manner that inflection points A1, A2 on the vibration amplification side are excluded and inflection points B1 and B2 on the vibration damping side are included. The torsional vibration of the engine 12 can be suppressed thereby, and as a result, vehicle quality can be enhanced through suppression of vibration and noise. Further, suppression of torsional vibration of the engine 12 allows mitigating the load that acts on the transmission 13, and allows enhancing the durability of the transmission 13. Likewise, suppression of torsional vibration of the engine 12 allows reducing the number of cylinders of the engine 12 and lowering the use region of engine revolutions, while enhancing the fuel efficiency of the vehicle.

In the instance illustrated in the figure, the carrier C is set to function as a first input element and the input ring gear Ri is set to function as a second input element, but the implementation is not limited thereto. For instance, the input ring gear Ri may be connected directly with the crankshaft 21, and the carrier C may be connected to the crankshaft 21 via the spring 22. In this case, the input ring gear Ri functions as the first input element, and the carrier C functions as the second input element. By providing the sun gear that meshes with the input pinion gear Pi, the sun gear may be set to function as the first input element (or second input element). The input ring gear Ri may be set to function as the second input element (or first input element), and the carrier C may be set to function as the second input element (or first input element), in a case where the sun gear that meshes with the input pinion gear Pi is set to function as the first input element (or second input element).

Figure 11:
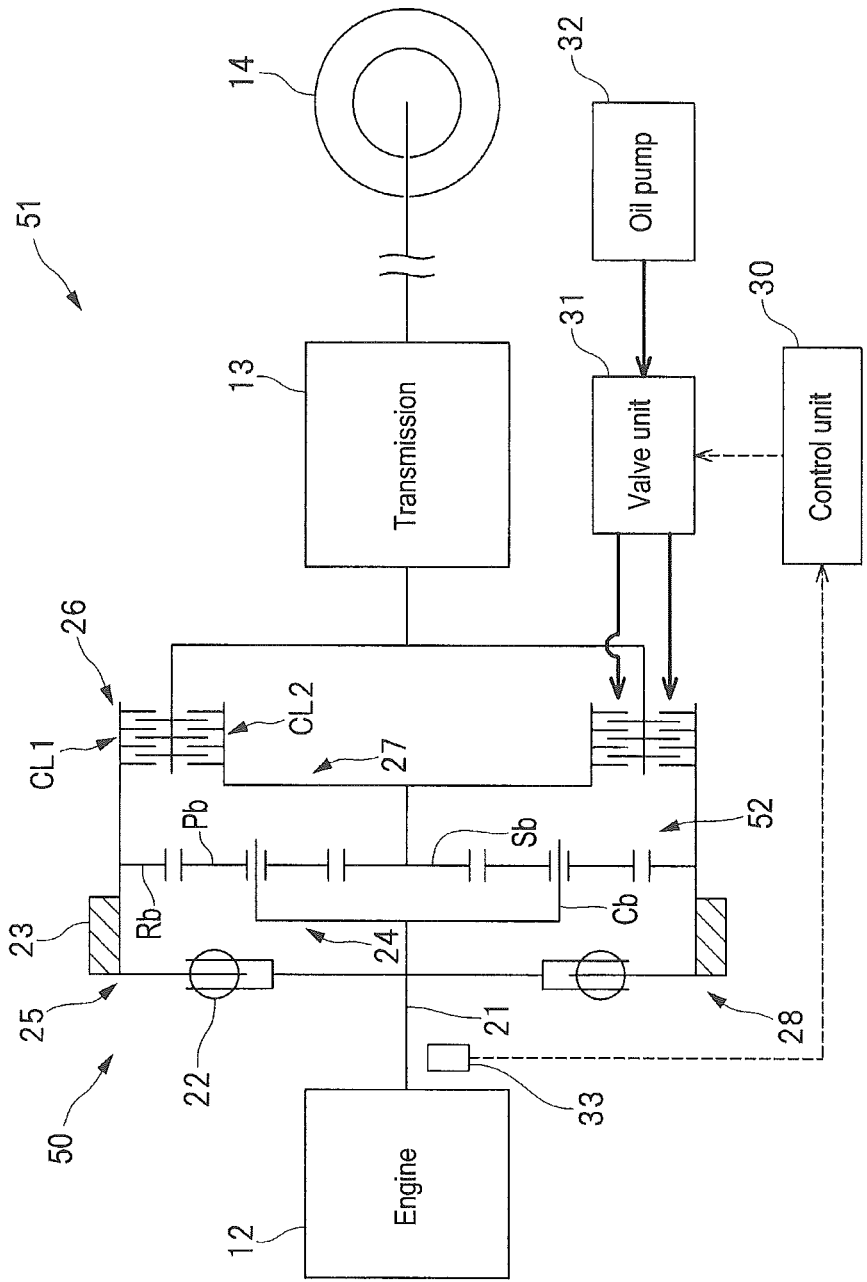
FIG. 11 is a schematic diagram illustrating a power unit that is provided with a damper device, which is another implementation of the present invention.

In the description of the first implementation of the present invention, the torque distribution mechanism 20 is made up of a compound planetary gear that comprises the compound pinion gear CP, but the implementation is not limited thereto, and the torque distribution mechanism 20 may be made up of a simple planetary gear train. FIG. 11 is a schematic diagram illustrating a power unit 51 comprising a damper device 50 being another implementation of the present invention. In FIG. 11, members that are illustrated in FIG. 1 and members identical to those illustrated in FIG. 1 are denoted by identical reference symbols, and a recurrent description thereof will be omitted.

As illustrated in FIG. 11, the damper device 50 comprises a torque distribution mechanism (planetary gear mechanism) 52 made up of a simple planetary gear train. The torque distribution mechanism 52 comprises a carrier (first input element) Cb connected to the crankshaft 21. The torque distribution mechanism 52 comprises a ring gear (second input element, first output element) Rb one side whereof is connected to the crankshaft 21 via the spring 22, the other side being connected to the transmission 13. The torque distribution mechanism 42 comprises a sun gear (second output element) Sb connected to the transmission 13. A pinion gear Pb that meshes with the ring gear Rb and the sun gear Sb is rotatably supported on the carrier Cb. The first clutch CL1 that is switched between the engaged state and the released state is provided between the ring gear Rb and the transmission 13. The second clutch CL2 that is switched between the engaged state and the released state is provided between the sun gear Sb and the transmission 13. Thus, a damping effect such as the one of the above-described damper device 11 can be achieved by switching the first clutch CL1 or the second clutch CL2 to the engaged state, on the basis of engine revolutions, also in a case where the second input element and the first output element are configured integrally in the form of one ring gear Rb that meshes with the pinion gears Pb.

Figure 12:
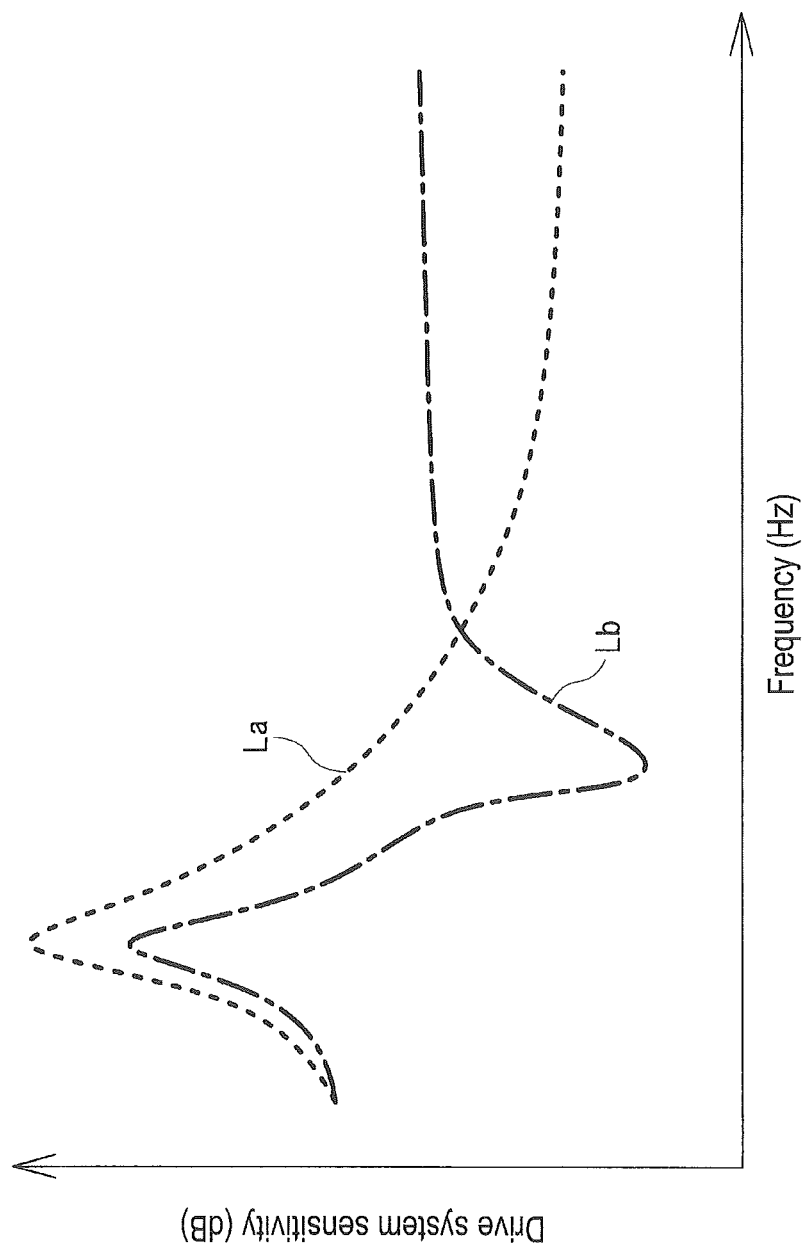
FIG. 12 is an image diagram illustrating a damping characteristic of torsional vibration by the damper device.
Figure 13:
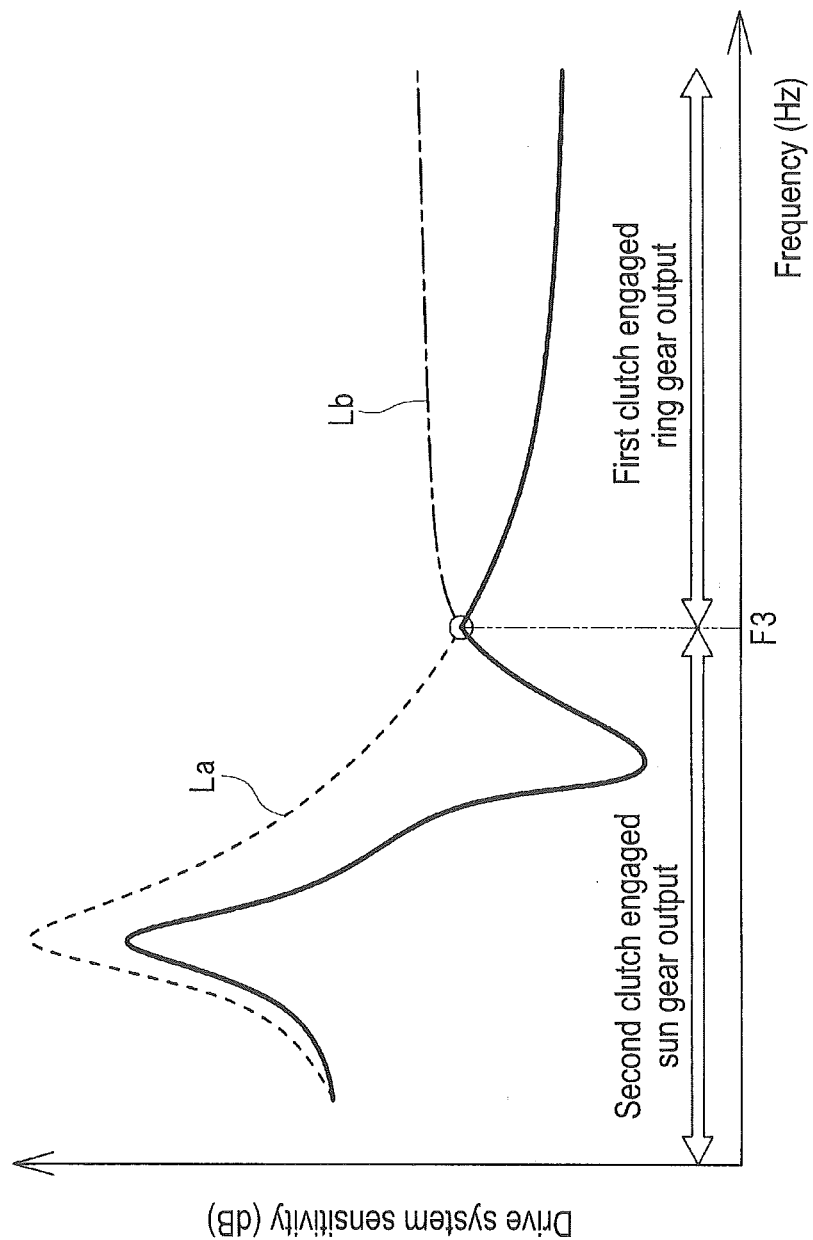
FIG. 13 is an explanatory diagram illustrating a control state of a first clutch and a second clutch.

FIG. 12 is an image diagram illustrating a damping characteristic of torsional vibration by the damper device 50. In FIG. 12, a characteristic line La represented by a dotted line denotes a damping characteristic of torsional vibration outputted from a ring gear 42r that is connected to the crankshaft 21 via the spring 22, and a characteristic line Lb represented by a dot-chain line denotes a damping characteristic of torsional vibration outputted from the sun gear Sb. FIG. 13 is an explanatory diagram illustrating a control state of the first clutch CL1 and the second clutch CL2.

As denoted by the characteristic lines La, Lb in FIG. 12, a difference in damping characteristic of torsional vibration arises between an instance where the engine torque is outputted from the ring gear Rb and an instance where the engine torque is outputted from the sun gear Sb. That is, a better damping characteristic of torsional vibration can be achieved in a case where the engine torque is outputted from the sun gear Sb through engagement of the second clutch CL2, at a low-medium frequency region. At a high frequency region, by contrast, a better damping characteristic of torsional vibration can be achieved in a case where the engine torque is outputted from the ring gear Rb through engagement of the first clutch CL1.

As illustrated in FIG. 13, specifically, the second clutch CL2 is engaged, in order for the engine torque to be outputted from the sun gear Sb, at a frequency region that is below a frequency F3 at which the characteristic lines La, Lb intersect, namely a region at which engine revolutions are below reference revolutions that correspond to the frequency F3 of torsional vibration. On the other hand, the first clutch CL1 is engaged in order for the engine torque to be outputted from the ring gear Rb, at a frequency region that exceeds the frequency F3, i.e. at a region at which engine revolutions exceed the reference revolutions corresponding to the frequency F3 of torsional vibration. A good damping characteristic can be obtained over the entire frequency region, as illustrated by the bold line in FIG. 13, through switching of the clutches CL1, CL2 to the engaged state, on the basis of engine revolutions.

Figure 14:
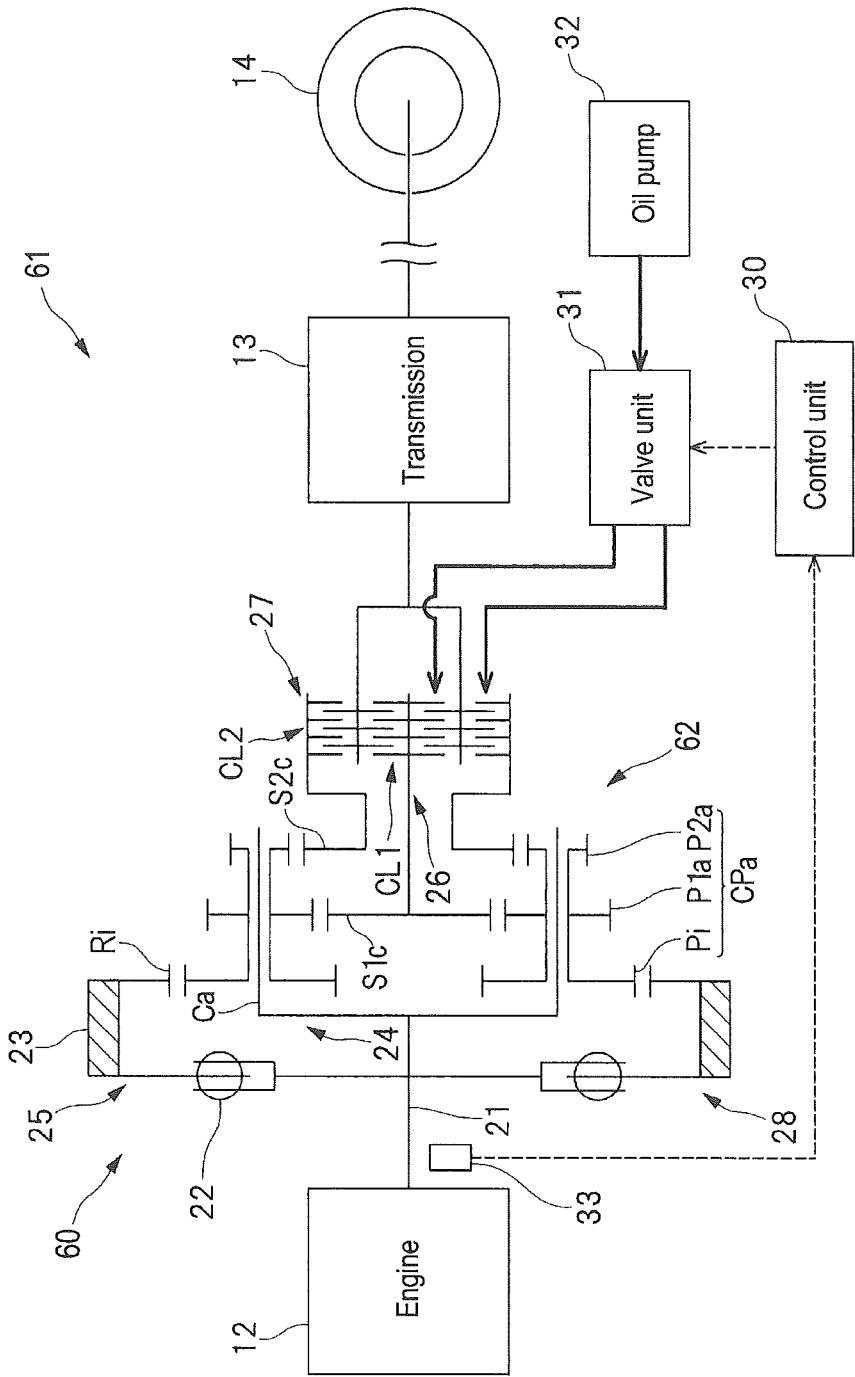
FIG. 14 is a schematic diagram illustrating a power unit that is provided with a damper device, which is another implementation of the present invention.

In the description of the second implementation of the present invention, the first ring gear R1a is set to function as the first output element, and the second ring gear R2a is set to function as the second output element, but the implementation is not limited thereto. FIG. 14 is a schematic diagram illustrating a power unit 61 comprising a damper device 60 being another implementation of the present invention. In FIG. 14, members that are illustrated in FIG. 6 and members identical to those illustrated in FIG. 6 are denoted by identical reference symbols, and a recurrent description thereof will be omitted.

As illustrated in FIG. 14, the damper device 60 comprises a torque distribution mechanism (planetary gear mechanism) 62. The torque distribution mechanism 62 comprises a first sun gear (first output element, gear) S1c connected to the transmission 13. The first sun gear S1c meshes with the first pinion gear P1a of the compound pinion gear CPa. The torque distribution mechanism 62 comprises a second sun gear (second output element, gear) S2c connected to the transmission 13. The second sun gear S2c meshes with the second pinion gear P2a of the compound pinion gear CPa. The first clutch CL1 that is switched between the engaged state and the released state is provided between the first sun gear S1c and the transmission 13. The second clutch CL2 that is switched between the engaged state and the released state is provided between the second sun gear S2c and the transmission 13. Further, the number of teeth of the first sun gear S1 is different from the number of teeth of the second sun gear S2c.

An effect identical to that of the above-described damper device 40 can be achieved by switching the first clutch CL1 or the second clutch CL2 to the engaged state, on the basis of engine revolutions, also in a case where the first sun gear S1 is set to function as the first output element the second sun gear S2 is set to function as the second output element. Specifically, the number of teeth of the first sun gear S1c is different from the second sun gear S2c; as a result, it becomes possible to modify the distribution ratio of the engine torques T1, T2 between an instance where the first clutch CL1 is engaged and an instance where the second clutch CL2 is engaged. Thus, the damping characteristic of torsional vibration can be modified as a result of switching between the output paths 26 and 27 through control of the clutches CL1 and CL2. It becomes accordingly possible to achieve a good damping characteristic over the entire frequency region.

Figure 15:
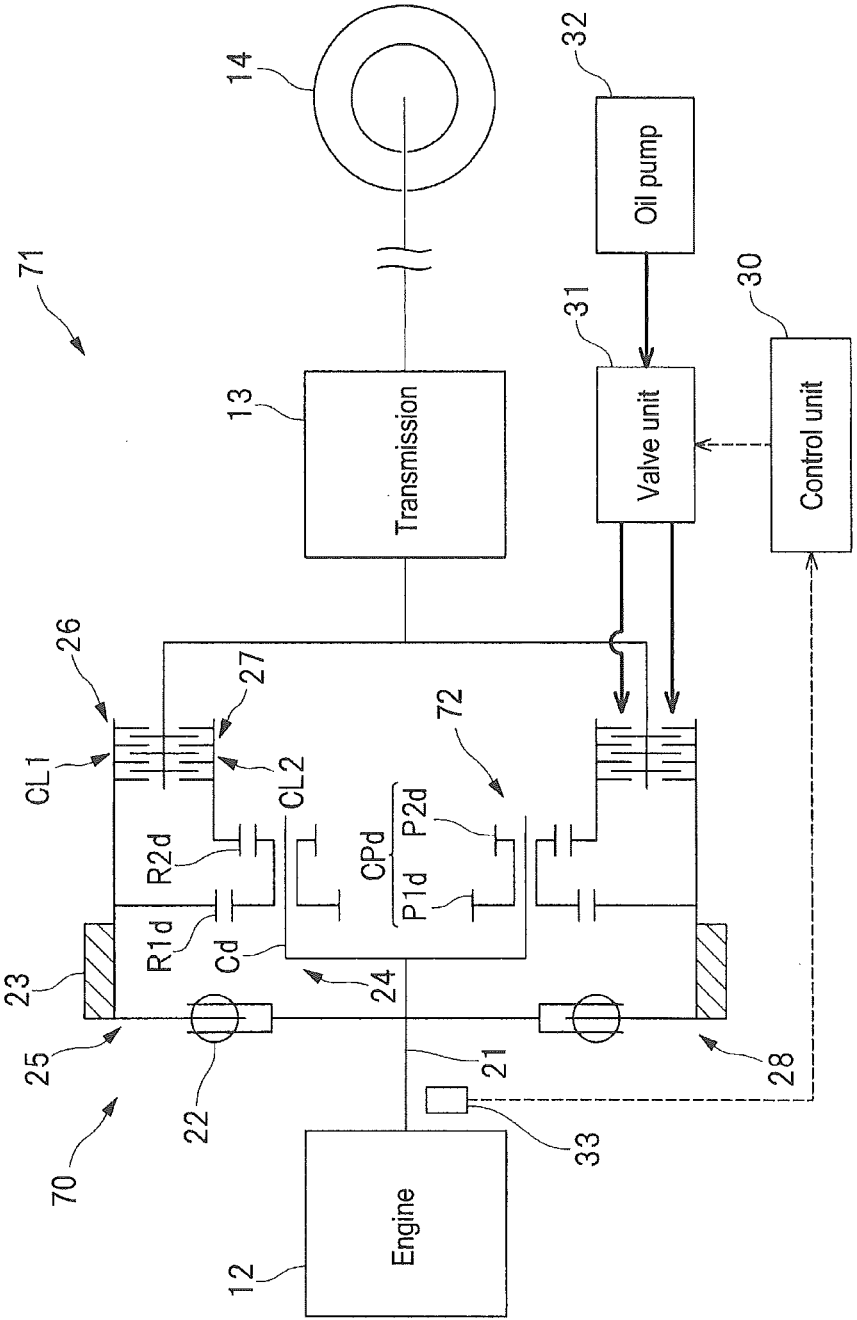
FIG. 15 is a schematic diagram illustrating a power unit that is provided with a damper device, which is another implementation of the present invention.

In the description above, the compound pinion gear CPa comprising three pinion gears Pi, P1a and P2a is resorted to, but the implementation is not limited thereto, and a compound pinion gear may be used that comprises two pinion gears. FIG. 15 is a schematic diagram illustrating a power unit 71 comprising a damper device 70 being another implementation of the present invention. In FIG. 15, members that are illustrated in FIG. 6 and members identical to those illustrated in FIG. 6 are denoted by identical reference symbols, and a recurrent description thereof will be omitted.

As illustrated in FIG. 15, the damper device 70 comprises a torque distribution mechanism (planetary gear mechanism) 72. The torque distribution mechanism 72 comprises a carrier (first input element) Cd connected with the crankshaft 21. The torque distribution mechanism 72 comprises a first ring gear (second input element, first output element, gear) R1d one side whereof is connected to the crankshaft 21 via the spring 22, the other side being connected to the transmission 13. The torque distribution mechanism 72 comprises a second ring gear (second output element, gear) R2d that is connected to the transmission 13. A compound pinion gear CPd that comprises two pinion gears P1d, P2d is rotatably supported on the carrier Cd. The first pinion gear P1d of the compound pinion gear CPd meshes with the first ring gear R1d, and the second pinion gear P2d of the compound pinion gear CPd meshes with the second ring gear R2d. The first clutch CL1 that is switched between the engaged state and the released state is provided between the first ring gear R1d and the transmission 13. The second clutch CL2 that is switched between the engaged state and the released state is provided between the second ring gear R2d and the transmission 13. Further, the number of teeth of the first ring gear R1d is different from the number of teeth of the second ring gear R2d.

An effect identical to that of the above-described damper device 11 can be achieved by switching the first clutch CL1 or the second clutch CL2 to the engaged state, on the basis of engine revolutions, also in a case where the second input element and the first output element are integrally configured in the form of one first ring gear R1d that meshes with the first pinion gear P1d. That is, a damping characteristic can be achieved through combination of the inertia member 23 and the spring 22, in a case where the first clutch CL1 is engaged, while a damping characteristic such that the distribution ratio of the engine torques T1 and T2 is modified can be achieved in a case where the second clutch CL2 is engaged. Thus, the damping characteristic of torsional vibration can be modified as a result of switching between the output paths 26, 27 through control of the clutches CL1 and CL2. It becomes accordingly possible to achieve a good damping characteristic over the entire frequency region.

The present invention is not limited to the above implementations, and, needless to say, may accommodate various modifications without departing from the spirit and scope of the invention. In the above description, the engagement region of the first clutch CL1 and the engagement region of the second clutch CL2 are divided along one or two frequencies as boundaries, but the present invention is not limited thereto, and the engagement region of the first clutch CL1 and the engagement region of the second clutch CL2 may be divided along a plurality of frequencies as boundaries, depending on the damping characteristic to be obtained. In the description above, the torque distribution mechanisms 20, 42, 52 and 72 are made up of planetary gear trains, but the invention is not limited thereto, and the torque distribution mechanisms may be made up of bevel gears or the like.

The first clutch CL1 and the second clutch CL2 are not limited to hydraulic clutches that are hydraulically switched between the engaged state and the released state, and may be electromagnetic clutches that are switched between the engaged state and the released state by electromagnetic forces. The first clutch CL1 and the second clutch CL2 may be friction clutches or meshing clutches. In the above description, the elastic member is exemplified in the form of the spring 22, but the present invention is not limited thereto, and a rubber member may be used as an elastic member.

The transmission 13 may be a manual transmission, a continuously-variable transmission, or a planetary gear-type or parallel shaft-type automatic transmission. A torque converter may be provided between each of the damper devices 11, 40, 50, 60 and 70 and the transmission 13, and a starting clutch may be provided between each of the damper device 11, 40, 50, 60 and 70 and the transmission 13. The damper devices 11, 40, 50, 60 and 70 each may be built into the case of the torque converter. The engine 12 is not limited to a gasoline engine, and may be a diesel engine or the like.

The invention claimed is:

1. A damper device disposed between an engine and a transmission, the damper device comprising:
   a torque distribution mechanism including:
      a first input element connected to the engine;
      a second input element connected to the engine via an elastic member;
      a first output element connected to the transmission; and
      a second output element connected to the transmission,
      wherein after combining a first torque output from the first input element and a second torque output from the second input element, the combined torque is output to one of the first output element and the second output element;
   a first clutch that is disposed between the first output element and the transmission, and that is switched between an engaged state of connecting the first output element to the transmission and a released state of disconnecting the first output element from the transmission; and
   a second clutch that is disposed between the second output element and the transmission, and that is switched between an engaged state of connecting the second output element to the transmission and a released state of disconnecting the second output element from the transmission,
   wherein the torque distribution mechanism comprises a planetary gear mechanism;
   the first input element comprises a carrier for rotatably supporting a first pinion gear;
   the second input element comprises a first ring gear meshing with the first pinion gear;
   the first output element comprises a second ring gear meshing with a second pinion gear that is fixed to the first pinion gear and that rotates integrally therewith; and
   the second output element comprises a sun gear meshing with the second pinion gear.

2. A damper device disposed between an engine and a transmission, the damper device comprising:
   a torque distribution mechanism including:
      a first input element connected to the engine;
      a second input element connected to the engine via an elastic member;
      a first output element connected to the transmission; and
      a second output element connected to the transmission,
      wherein after combining a first torque output from the first input element and a second torque output from the second input element, the combined torque is output to one of the first output element and the second output element;
   a first clutch that is disposed between the first output element and the transmission, and that is switched between an engaged state of connecting the first output element to the transmission and a released state of disconnecting the first output element from the transmission;
   a second clutch that is disposed between the second output element and the transmission, and that is switched between an engaged state of connecting the second output element to the transmission and a released state of disconnecting the second output element from the transmission; and
   a clutch controller for switching the first clutch or the second clutch to the engaged state on the basis of a rotational speed of the engine, wherein
   the torque distribution mechanism comprises a planetary gear mechanism;
   the first input element comprises a carrier for rotatably supporting a first pinion gear;
   the second input element comprises a first ring gear meshing with the first pinion gear;
   the first output element comprises a second ring gear meshing with a second pinion gear that is fixed to the first pinion gear and that rotates integrally therewith; and
   the second output element comprises a sun gear meshing with the second pinion gear.

* * * * *